United States Patent
Kuribayashi

(10) Patent No.: US 8,917,304 B2
(45) Date of Patent: Dec. 23, 2014

(54) OPTICAL SCANNING APPARATUS AND IMAGE FORMING APPARATUS

(71) Applicants: Kabushiki Kaisha Toshiba, Minato-ku, Tokyo (JP); Toshiba Tec Kabushiki Kaisha, Shinagawa-ku, Tokyo (JP)

(72) Inventor: Yasushi Kuribayashi, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/912,384

(22) Filed: Jun. 7, 2013

(65) Prior Publication Data

US 2014/0071220 A1    Mar. 13, 2014

(30) Foreign Application Priority Data

Sep. 13, 2012    (JP) .................................. 2012-201814

(51) Int. Cl.
  *B41J 15/14*    (2006.01)
  *B41J 27/00*    (2006.01)
  *G02B 26/10*    (2006.01)
  *G02B 26/12*    (2006.01)

(52) U.S. Cl.
  CPC ............... *G02B 26/108* (2013.01); *G02B 26/10* (2013.01); *G02B 26/127* (2013.01)
  USPC .......................................... 347/241; 347/256

(58) Field of Classification Search
  USPC ......... 347/229, 234–237, 241–245, 248–250, 347/256–261
  See application file for complete search history.

(56) References Cited

U.S. PATENT DOCUMENTS

| 7,576,315 B2 * | 8/2009 | Taniguchi et al. ............ 250/235 |
| 8,314,827 B2 | 11/2012 | Mihara et al. |
| 2006/0049344 A1 | 3/2006 | Kasai |

FOREIGN PATENT DOCUMENTS

| JP | 63-124664 | 5/1988 | |
| JP | 09230276 A | * 9/1997 | ............ G02B 26/10 |
| JP | 09243941 A | * 9/1997 | ............ G02B 26/10 |
| JP | 2003-302588 | 10/2003 | |
| JP | 2006-072058 | 3/2006 | |

OTHER PUBLICATIONS

Office Action of Notification of Reason(s) for Refusal for Japanese Patent Application No. 2012-201814 Dated Jun. 24, 2014, 3 pgs.

* cited by examiner

*Primary Examiner* — Hai C Pham
(74) *Attorney, Agent, or Firm* — Amin, Turocy & Watson, LLP

(57) ABSTRACT

In accordance with an embodiment, an optical scanning apparatus for exposing a photoconductor includes a light source, a deflecting device, an imaging optical system and a light-guiding optical system. The light source configured to emit a light beam. The deflecting device configured to deflect and scan the light beam from the light source. The imaging optical system configured to form an image by using the deflected and scanned light beam on the photoconductor. The light-guiding optical system configured to guide the light beam passing through the imaging optical system to a photodetector.

3 Claims, 7 Drawing Sheets

OPTICAL SCANNING APPARATUS AND IMAGE FORMING APPARATUS

CROSS-REFERENCE TO RELATED APPLICATION

This application is based upon and claims the benefit of priority from Japanese Patent Application No. 2012-201814, filed Sep. 13, 2012, the entire contents of which are incorporated herein by reference.

FIELD

Embodiments described herein relate to an optical scanning apparatus and an image forming apparatus provided with the optical scanning apparatus.

BACKGROUND

An optical scanning apparatus scans the light beam emitted from a light source in a horizontal scanning direction and then guides the light beam to a photoconductor. Here, the light beam from the light source is partially guided to a synchronous detection sensor, and the beginning positions of the images (electrostatic latent images) on the photoconductor are unified based on the output of the synchronous detection sensor.

DETAILED DESCRIPTION

In accordance with one embodiment, an optical scanning apparatus for exposing a photoconductor includes a light source, a deflecting device, an imaging optical system and a light-guiding optical system. The light source configured to emit a light beam. The deflecting device configured to deflect and scan the light beam from the light source. The imaging optical system configured to form an image by using the deflected and scanned light beam on the photoconductor. The light-guiding optical system configured to guide the light beam passing through the imaging optical system to a photodetector. The output of the photodetector realizes the synchronization in the horizontal direction when an image (electrostatic latent image) is formed on the photoconductor.

Figure 1:
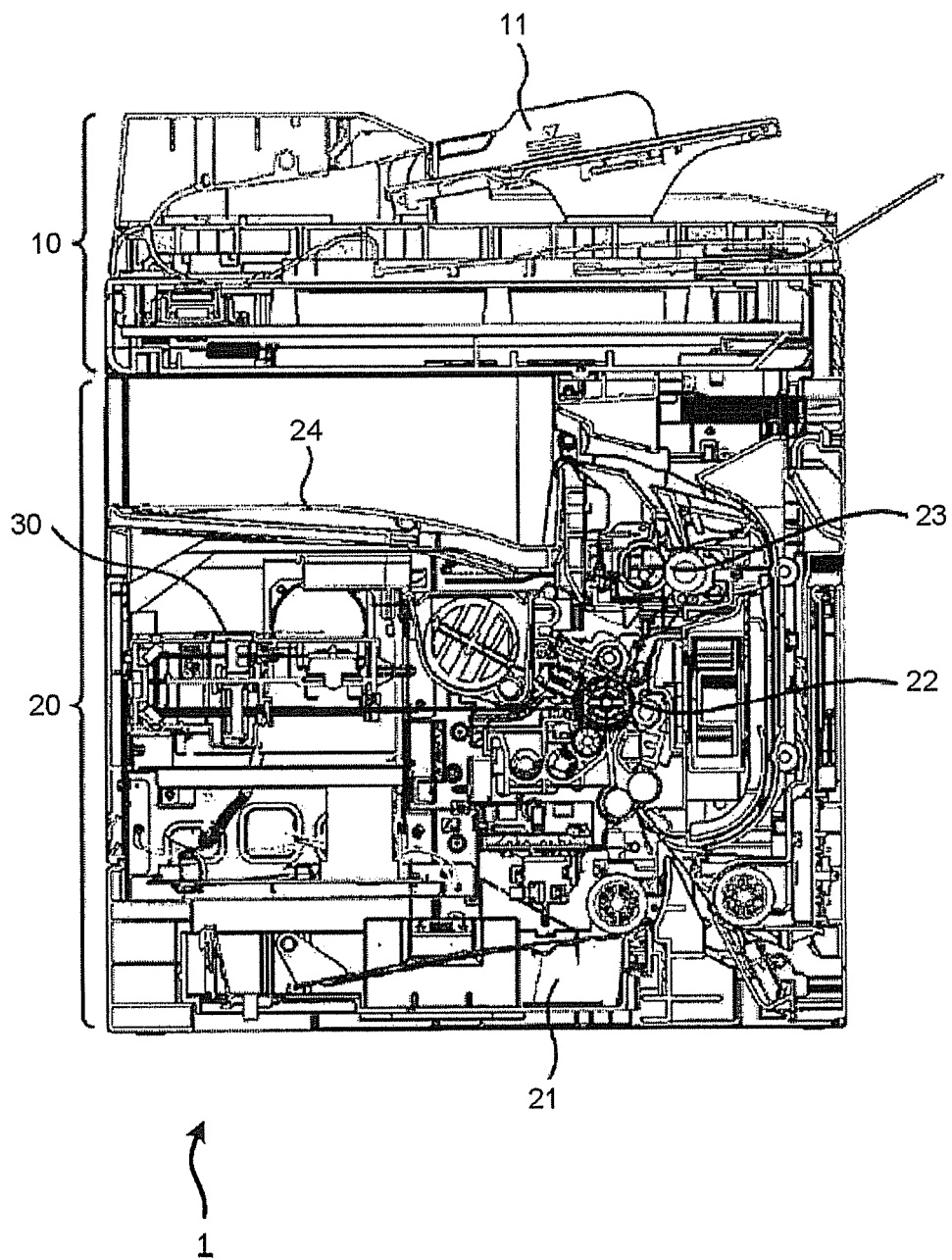
FIG. 1 is a longitudinal section view of an image forming apparatus.

FIG. 1 is a longitudinal section view of an image forming apparatus (MFP: multi Function Peripheral) according to one embodiment. An image forming apparatus 1 comprises an image reading unit 10 and an image forming unit 20. The image reading unit 10 scans and reads the image of an original sheet or book. The image forming unit 20 forms a developer image on a sheet based on the image read by the reading unit 10 from the original or the image data sent to the image forming apparatus 1 from an external device.

The image reading unit 10 comprises an automatic document feeder (ADF) 11. The image reading unit 10 reads the image of the original fed by the ADF 11 or the original held on an original table. The image forming unit 20 comprises a paper feed cassette 21, a developing device 22, an optical scanning apparatus 30, a fixer 23 and a paper discharging tray 24.

Actions of the image forming unit 20 are described below. The sheet stored in the paper feed cassette 21 is conveyed to the developing device 22 by a pickup roller or a conveyance roller. The developing device 22 forms a developer image for the sheet conveyed from the paper feed cassette 21. Specifically, the photoconductor included in the developing device 22 is exposed using the light beam from the optical scanning apparatus to form an electrostatic latent image on the photoconductive surface of the photoconductor.

Then, the electrostatic latent image is developed by supplying the developer to the photoconductor. A developer image is formed on the photoconductive surface of the photoconductor and then transferred on the sheet conveyed from the paper feed cassette 21. The sheet transferred with the developer image is conveyed to the fixer 23. The fixer 23 heats the sheet to fix the developer image on the sheet. The sheet passing through the fixer 23 is conveyed to the paper discharging tray 24. The sheet conveyed from the fixer 23 is stacked in the paper discharging tray 24.

The structure of the image forming apparatus 1 shown in FIG. 1 is just an example, and the image forming apparatus 1 may have any other structure so long as it enables the image forming apparatus to form a developer image on a sheet.

Figure 2:
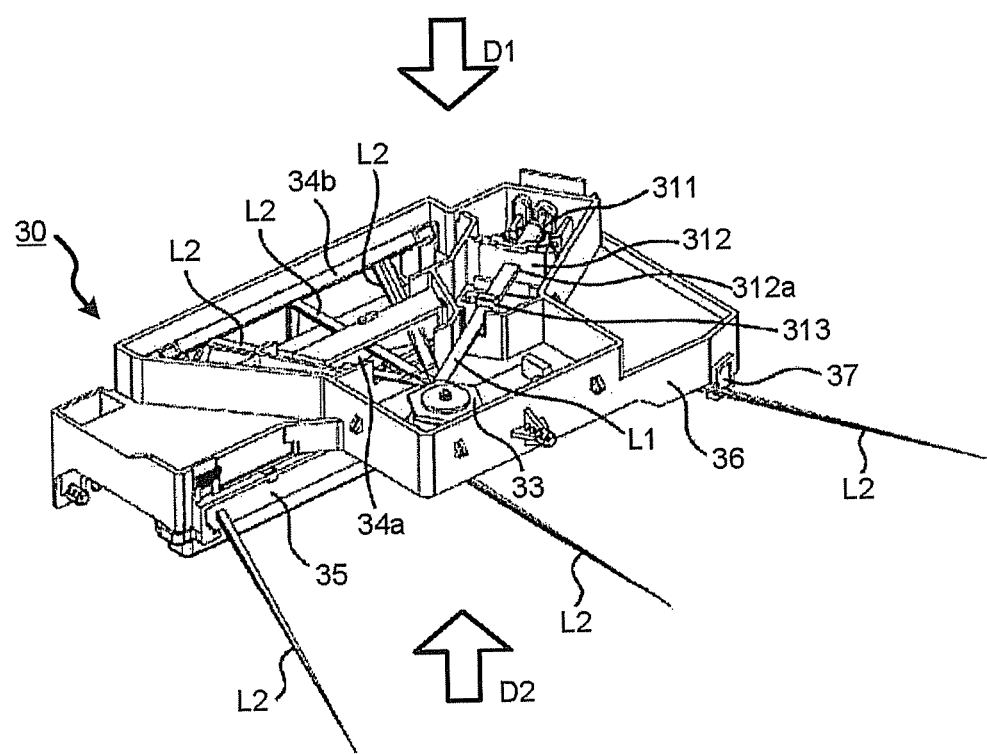
FIG. 2 is a perspective view of an optical scanning apparatus.
Figure 3:
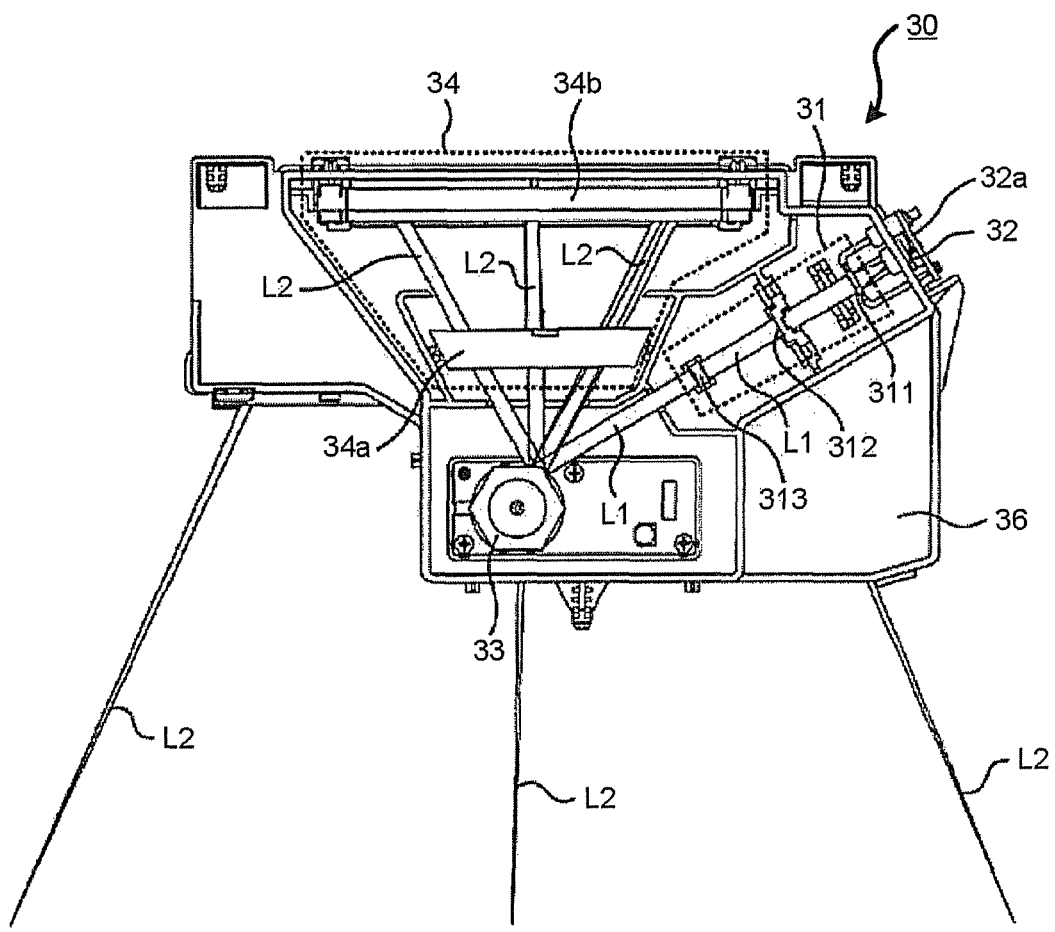
FIG. 3 is a top view of an optical scanning apparatus.
Figure 4:
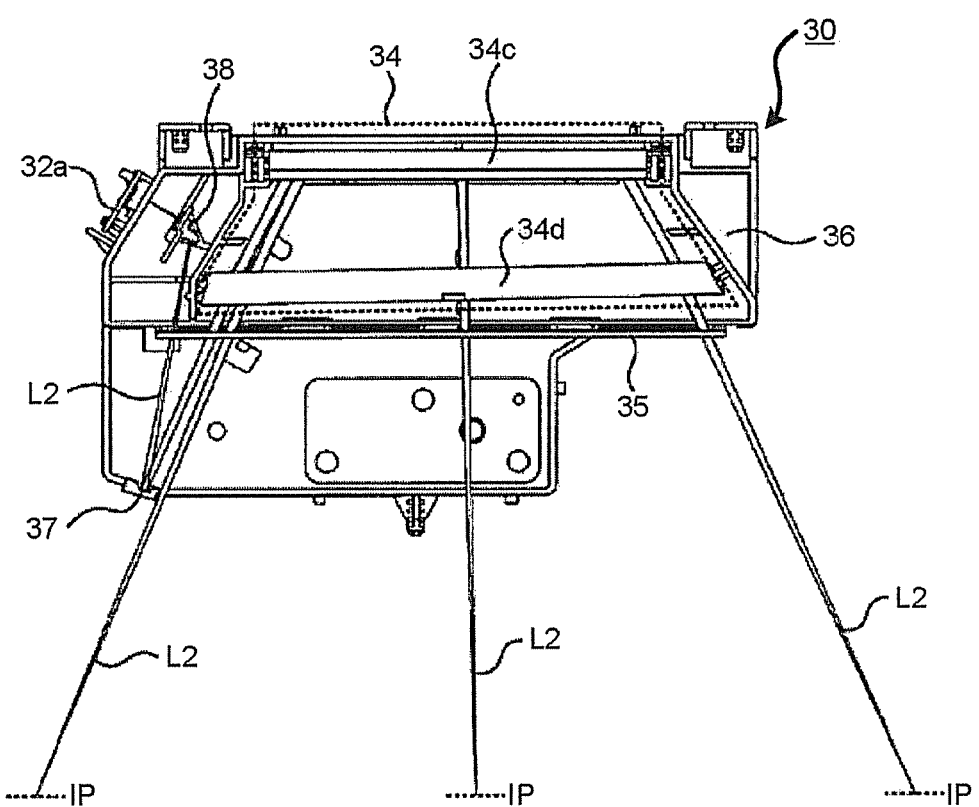
FIG. 4 is a bottom view of an optical scanning apparatus.

Next, the structure of the optical scanning apparatus 30 is described. FIG. 2 is a perspective view of the optical scanning apparatus 30. FIG. 3 is a diagram illustrating the optical scanning apparatus 30 seen from the top (the direction indicated by the arrow D1 shown in FIG. 2). FIG. 4 is a diagram illustrating the optical scanning apparatus 30 seen from the bottom (the direction indicated by the arrow D2 shown in FIG. 2).

The first optical system 31 shown in FIG. 3 endows the light beam emitted from the light source 32 with a specific characteristic. The light source 32 is fixed on the housing 36 of the optical scanning apparatus 30 and mounted on a circuit board 32a which is used to drive the light source 32.

The first optical system 31 comprises a collimator lens 311, an aperture plate 312 and a cylindrical lens 313. The light beam L1 emitted from the light source 32 is incident to the collimator lens 311. The light beam L1 emitted from the light source 32 is diverging light, which is transformed into parallel light by the collimator lens 311 later. The collimator lens 311 is held by the housing 36 of the optical scanning apparatus 30.

The light beam L1 passing through the collimator lens 311 passes through the aperture plate 312. As shown in FIG. 2, the aperture plate 312 has a hole unit 312a through which the light beam from the collimator lens 311 passes. The aperture plate 312 can be formed by die-cutting a plate.

The aperture plate 312 is held by the housing 36. Here, the aperture plate 312 is configured in such a type that the center of the hole unit 312a is located on an optical axis. The aperture plate 312 shields the part of the light beam from the collimator lens 311 which does not face the hole unit 312a.

The light beam passing through the hole unit 312a of the aperture plate 312 is incident to the cylindrical lens 313. The cylindrical lens 313 held by the housing 36 gathers the light beam from the aperture plate 312 in a vertical scanning direction.

After passing through the first optical system 31, the light beam emitted from the light source 32 reaches a polygon mirror (equivalent to a deflecting device) 33. The polygon mirror 33 rotationally fixed on the housing 36 and reflects the light from the first optical system 31 towards a second optical system 34. The polygon mirror 33 deflects the light beam from the first optical system 31 in the horizontal scanning direction (the left and right directions shown in FIG. 3) by the rotation.

The light beam reflected by the polygon mirror 33 is incident to the second optical system 34. The second optical system 34 guides the light beam from the polygon mirror 33 to the photoconductor of the developing device 22. That is, the second optical system (equivalent to an imaging optical system) 34 images the light beam from the polygon mirror 33 on the photoconductive surface of the photoconductor. The second optical system 34 comprises a first imaging lens 34a, a first reflecting mirror 34b, a second reflecting mirror 34c and a second imaging lens 34d.

The first imaging lens 34a extends in the horizontal direction (the left and right directions shown in FIG. 3), and the second imaging lens 34d extends in the horizontal scanning direction (the left and right direction shown in FIG. 4). The reflected light from the polygon mirror 33 is gathered in the vertical scanning direction (the direction orthogonal to the primary scanning direction) by the two imaging lenses. The first imaging lens 34a and the second imaging lens 34d gather the reflected light of the polygon mirror 33 in the vertical scanning direction, thereby correcting the deviation of the light beam caused by the inclination on the reflecting surface of the polygon mirror 33. In the horizontal scanning direction, light is gathered in the same way.

The first reflecting mirror 34b reflects the light beam passing through the first imaging lens 34a towards the second reflecting mirror 34c shown in FIG. 4. The second reflecting mirror 34c reflects the light beam passing through the first reflecting mirror 34b towards the second imaging lens 34d. In FIG. 2-FIG. 4, L1 represents a light beam which is not deflected by the polygon mirror 33, and L2 represents a light beam deflected by the polygon mirror 33.

As shown in FIG. 4, the light beam passing through the second imaging lens 34d is transmitted to the developing device 22 through a dustproof glass 35 which is fixed on the housing 36 to prevent dust and other foreign matters from entering the optical scanning apparatus 30. The first optical system 31, the polygon mirror 33 and the second optical system 34 are enclosed by the housing 36 and the dustproof glass 35 so as to prevent the attachment of dust and other foreign matters.

The light beam passing through the dustproof glass 35 is partially reflected by a reflecting mirror 37 which is configured at a position deflected from the light path between the second imaging lens 34d and the photoconductor. The light reflected by the reflecting mirror 37 passes through the dustproof glass 35 and is then guided to a light guiding prism 38 which is mounted on the housing 36 at a position adjacent to the second optical system 34.

The light guiding prism 38 guides the light beam from the reflecting mirror 37 to a synchronous detection sensor 39 which detects the light beam from the light guiding prism 38. After the synchronous detection sensor 39 detects the light beam from the light guiding prism 38, the light source 32 carries out light-emitting corresponding to an image data. In this way, the beginning positions of the images on the photoconductor of the developing device 22 are unified.

As shown in FIG. 4, the length of light path from the light source 32 to an imaging position IP is equal to the length of light path from the light source 32 to the synchronous detection sensor 39. In one embodiment, the light paths are turned back by the reflecting mirror 37 to guarantee the length of the light paths.

Figure 5:
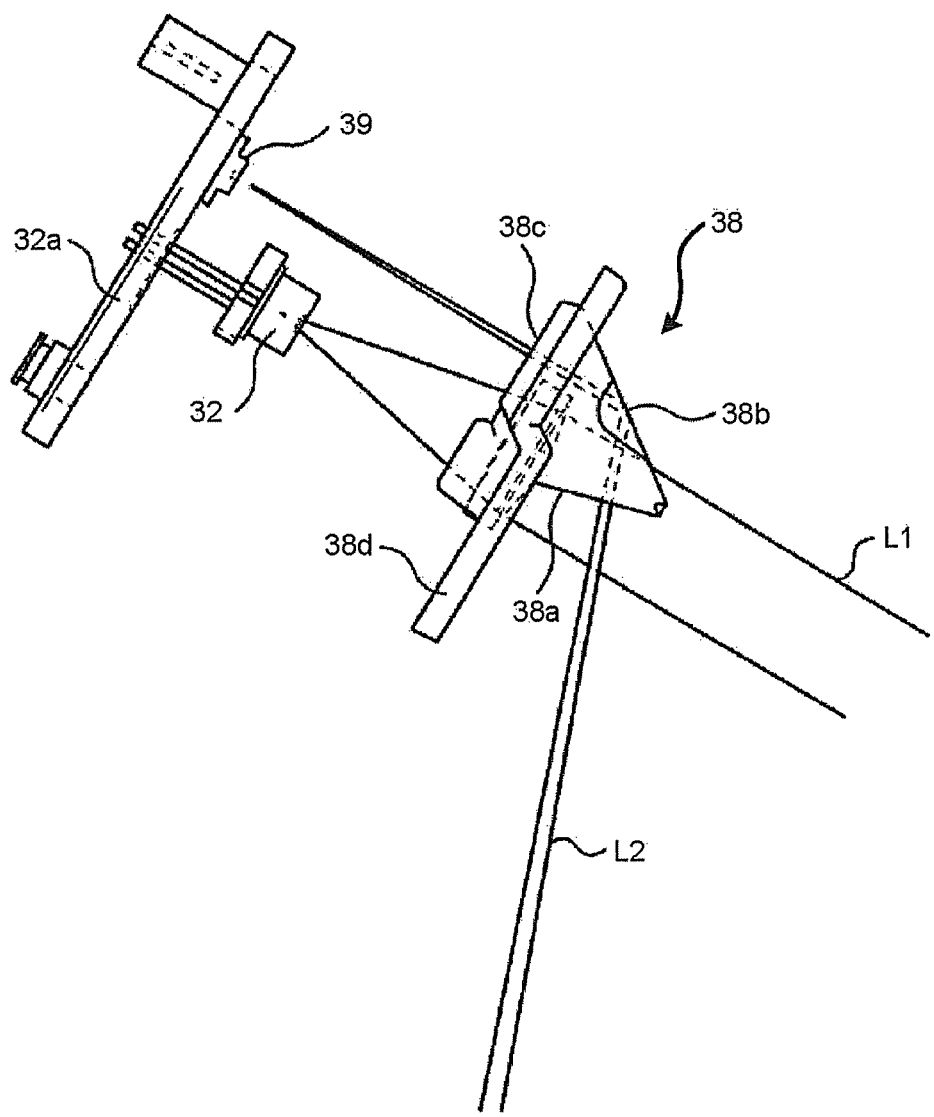
FIG. 5 is a diagram illustrating the structure of a light guiding prism.
Figure 6:
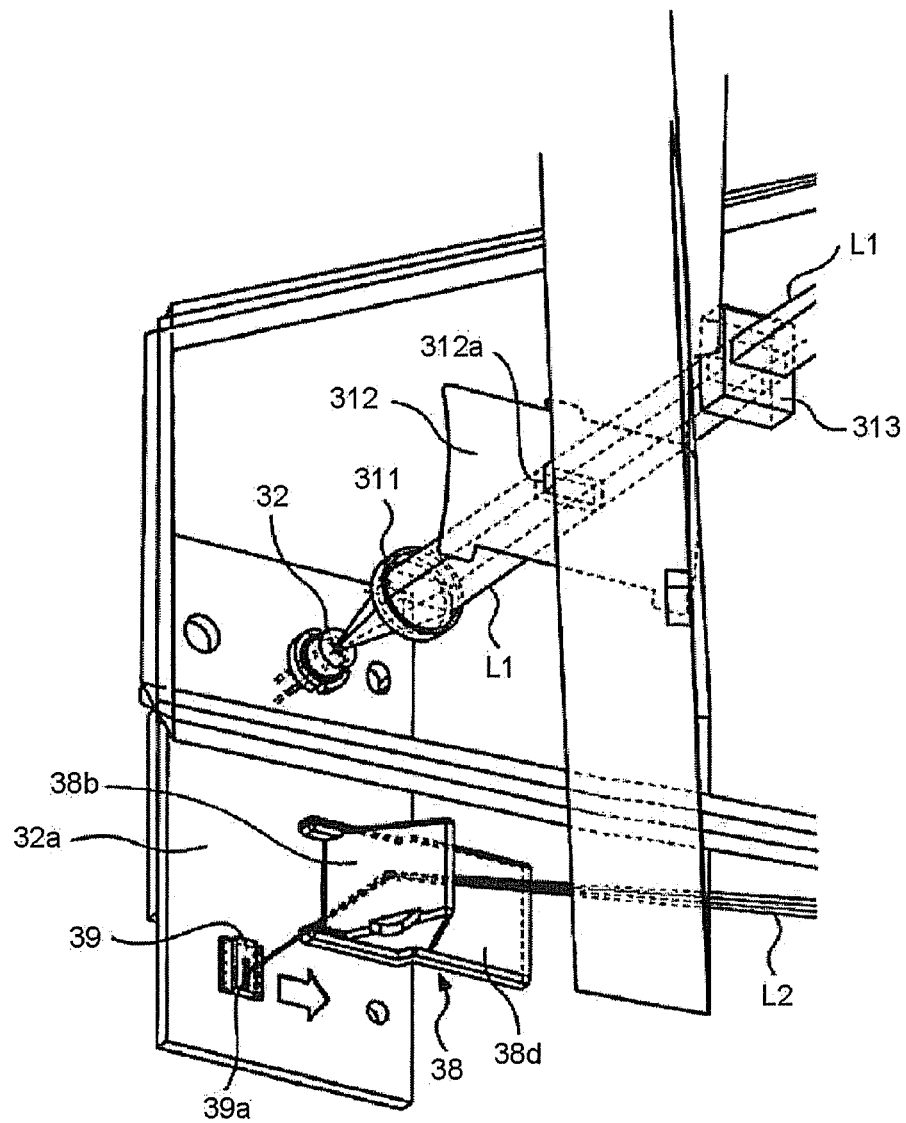
FIG. 6 is a diagram illustrating the surrounding structure of a light source and a synchronous detection sensor.
Figure 7:
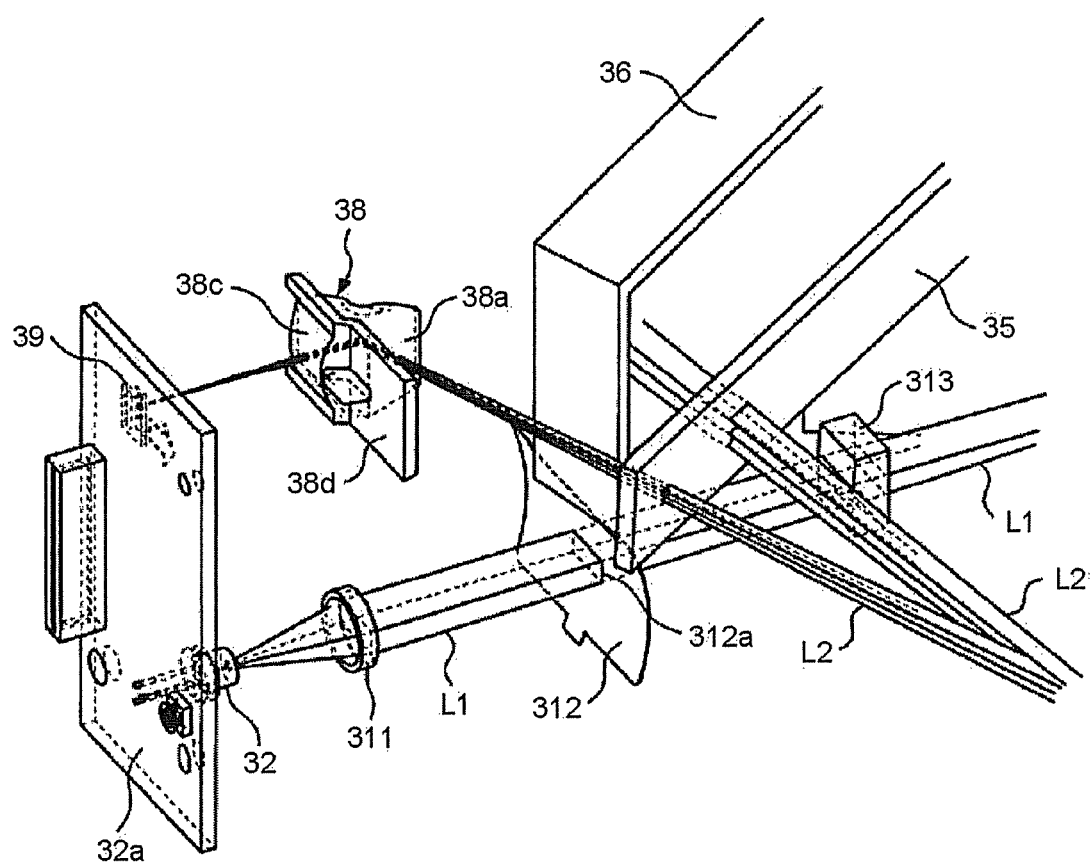
FIG. 7 is a diagram illustrating the surrounding structure of a light source and a synchronous detection sensor.

As shown in FIG. 5-FIG. 7, the synchronous detection sensor 39 is fixed on the circuit board 32a.

FIG. 5 is a diagram illustrating the position relationship among the light guiding prism 38, the light source 32 and the synchronous detection sensor 39. FIG. 6 and FIG. 7 are diagrams illustrating the position relationships between the first optical system 31 and the light guiding prism 38 seen from different directions with each other.

The synchronous detection sensor 39 and the light source 32 are configured at staggered positions in the vertical direction of the optical scanning apparatus 30 (in other words, in the vertical scanning direction).

In one embodiment, the light beam passing through the dustproof glass 35 reaches the reflecting mirror 37. However, the reflecting mirror 37 may also be configured on the light path between the dustproof glass 35 and the second imaging lens 34d. That is, the reflecting mirror 37 may be configured in the space enclosed by the dustproof glass 35 and the housing 36.

The reflecting mirror 37 reflects the light beam from the second imaging lens 34d towards the light guiding prism 38. If the reflecting mirror 37 is configured in the space enclosed by the dustproof glass 35 and the housing 36, as long as the length of light path from the light source 32 to the synchronous detection sensor 39 is equal to the one from the light source 32 to the imaging position IP.

As shown in FIG. 5, the light guiding prism 38 has an incidence surface 38a, a total reflecting surface 38b, an exit surface 38c and a flange 38d. The light guiding prism 38 is made from a substantial and transparent material so that the light beam from the reflecting mirror 37 will not be attenuated. The material of the light guiding prism 38 may be glass or resin which may refer to acrylic resin or polycarbonate resin.

The flange 38d of the light guiding prism 38 fixes the light guiding prism 38 at a specific position. That is, the light guiding prism 38 is fixed at a specific position with the flange 38d is held by the housing 36.

The light beam passing through the dustproof glass 35 is incident on the incidence surface 38a of the light guiding prism 38. The incidence surface 38a is inclined with respect to the optical axis of the light beam L2 emitted from the reflecting mirror 37 to the incidence surface 38a. In other words, the incidence surface 38a is inclined with respect to a surface orthogonal to the optical axis of the light beam L2. When incident on the incidence surface 38a, the light beam L2 may be partially reflected by the incidence surface 38a.

By inclining the incidence surface 38a with respect to the surface orthogonal to the optical axis of the light L2, the light component reflected by the incidence surface 38a can be guided to a direction deflected from the light path between the reflecting mirror 37 and the light guiding prism 38. Moreover, the light reflected by the incidence surface 38a can be controlled to return to the side of the second optical system 34.

The light beam L2 incident on the incidence surface 38a passes through the interior of the light guiding prism 38 and then reaches the total reflecting surface 38b. The total reflecting surface 38b reflects the light beam L2 from the incidence surface 38a towards the exit surface 38c. The total reflecting surface 38b can be configured with lens surfaces meeting total reflection condition, or the surface 38b can be evaporated with a reflecting film to reflect the light beam L2 totally.

In addition, the surface 38b of the light guiding prism 38 may not be a total reflecting surface. However, with the use of the total reflecting surface 38b, the light quantity of the light beam L2 guided by the synchronous detection sensor 39 is lost less.

The exit surface 38c images the light beam L2 from the total reflecting surface 38b on the light receiving surface 39a of the synchronous detection sensor 39. By transmitting the light beam L2 from the exit surface 38c to the light receiving surface 39a, the synchronous detection sensor 39 outputs a signal corresponding to the light-receiving. The output signal of the synchronous detection sensor 39 is used as a horizontal synchronization signal when the forming of an electrostatic latent image on the photoconductor.

The exit surface 38c has a positive optical power in the vertical scanning direction (the direction orthogonal to the sheet shown in FIG. 5). As the exit surface 38c has a positive optical power, the light facing the synchronous detection sensor 39 can be gathered in the vertical scanning direction. For example, the exit surface 38c may be configured with a cylindrical surface.

If the reflecting mirror 37 deflects towards a specific direction, then the light beam L2 guided to the light guiding prism 38 from the reflecting mirror 37 may be deflected from the vertical scanning direction. Therefore, with the exit surface 38c having a positive optical power in the vertical scanning direction, the light beam L2 exited from the light guiding prism 38 to the synchronous detection sensor 39 is prevented from deflecting from the vertical scanning direction.

In one embodiment, by taking the inclination of the reflecting mirror 37 into consideration, for the exit surface 38c of the light guiding prism 38, make an optical power in the vertical scanning direction. However, in the structure in which the inclination of the reflecting mirror 37 is prevented, the exit surface 38c of the light guiding prism 38 may be made with no optical power in the vertical scanning direction.

In one embodiment, the light beam passing through the second imaging lens 34d is guided to the synchronous detection sensor 39 by using the reflecting mirror 37 and the light guiding prism 38. The light guiding lens 38 may be replaced by the optical surface which reflects the light beam L2 from the reflecting mirror 37 (equivalent to the total reflecting surface 38b). Further, the light beam L2 is gathered in the vertical scanning direction as along as an optical surface (equivalent to the exit surface 38c) having a positive optical power is set in the vertical scanning direction.

In the light guiding prism 38 of one embodiment, the total reflecting surface 38b and the exit surface 38c are integrally formed, thus, the total reflecting surface 38b and the exit surface 38c can be easily positioned. As the total reflecting surface 38b and the exit surface 38c are integrally formed, the number of parts can be reduced when compared with a case which the total reflecting surface 38b and the exit surface 38c are separately formed by other optical parts.

In the light guiding prism 38 of one embodiment, the light beam L2 from the reflecting mirror 37 is reflected by the total reflecting surface 38b only once. However, a plurality of reflecting surfaces may be used to reflect the light beam L2 from the reflecting mirror 37 for many times. A plurality of reflecting surfaces may be integrally formed on one lens, or each reflecting surface may consist of separate optical parts.

In the light guiding prism 38 of one embodiment, only the exit surface 38c has a positive optical power in the vertical scanning direction. However, at least one of the optical surfaces configuring the light guiding lens 38 has a positive optical power in the vertical scanning direction. For example, the incidence surface 38a or the total reflecting surface 38b may have a positive optical power in the vertical scanning direction.

According to one embodiment, the light beam L2 imaged in the horizontal scanning direction by the second optical system 34 (imaging lenses 34a and 34b) is guided to the synchronous detection sensor 39. In other words, the light beam L2 reaching the photoconductor of the developing device 22 is guided to the synchronous detection sensor 39. As a light beam L2 equivalent to the light beam L2 reaching the photoconductor reaches the synchronous detection sensor 39, the precision of the starting position of the image for the photoconductor can be improved.

In a case which the light beam L2 is guided to the synchronous detection sensor 39, the guiding of the light beam L2 before reaching the second optical system 34 to the synchronous detection sensor 39 is taken into consideration, as described in Japanese Unexamined Patent Application Publication No. 2011-248228. In this case, a light condensing lens having a positive power in the horizontal scanning direction and the vertical scanning direction must be used on the light path before the light beam L2 reaches the synchronous detection sensor 39 so as to gather the light beam L2 in the horizontal scanning direction.

However, If the light beam L2 is gathered in the horizontal scanning direction by a condensing lens, as stated above, as the light beam gathered in the horizontal scanning direction is detected by the imaging lens, it is not necessary for the light guiding prism to have a positive power in the horizontal scanning direction, as a result, the light beam L2 reaching the synchronous detection sensor 39 is different from the light beam L2 reaching the photoconductor L2 due to the differences of the condensing lens and the second optical system 34 in optical property. In this case, error detection may occur when the synchronous detection sensor 39 detects a light component different from the light beam L2 imaged on the photoconductor.

According to one embodiment, the light beam L2 reaching the photoconductor, that is, the light beam L2 passing through the second optical system 34, is guided to the synchronous detection sensor 39, as stated above, thereby preventing the error detection of the synchronous detection sensor 39.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. An optical scanning apparatus for exposing a photoconductor, comprising:
    a light source configured to emit a light beam;
    a deflecting device configured to deflect and scan the light beam from the light source;
    an imaging optical system configured to form an image by using the deflected and scanned light beam on the photoconductor;
    a housing and a dustproof glass configured to enclose the light source, the deflecting device and the imaging optical system;
    a mirror configured to reflect the light beam from the imaging optical system that passes through the dustproof glass; and a prism configured to guide the light beam that is reflected by the mirror and passes through the dustproof glass into a photodetector.

2. The optical scanning apparatus according to claim 1, wherein
the prism includes:
an incidence surface configured to incident the light beam reflected by the mirror is incident;
a reflecting surface configured to reflect the light beam from the incidence surface; and
an exit surface configured to transmit the light beam from the reflecting surface to the photodetector.

3. An image forming apparatus, comprising:
the optical scanning apparatus according to claim 1;
a developing device configured to receive the light beam from the optical scanning apparatus to form an electrostatic latent image and transfer a developer image corresponding to the electrostatic latent image onto a sheet; and
a fixer configured to heat the sheet transferred with the developer to fixing developer on the sheet.

* * * * *